(12) United States Patent
Jin et al.

(10) Patent No.: US 8,761,291 B2
(45) Date of Patent: Jun. 24, 2014

(54) IMPLICIT SPATIAL MATRIX EXPANSION DETERMINATION FOR MIMO WIRELESS COMMUNICATION SYSTEMS

(75) Inventors: Hang Jin, Plano, TX (US); Li Guo, Irving, TX (US); Paul J. Stager, Akron, OH (US); Matthew A. Silverman, Shaker Heights, OH (US); Bror Peterson, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 437 days.

(21) Appl. No.: 13/167,790

(22) Filed: Jun. 24, 2011

(65) Prior Publication Data

US 2012/0328033 A1   Dec. 27, 2012

(51) Int. Cl.
*H04B 7/02* (2006.01)
*H04L 1/02* (2006.01)

(52) U.S. Cl.
USPC ............................. 375/267; 375/347; 375/262

(58) Field of Classification Search
USPC .......................................... 375/267, 222, 220
See application file for complete search history.

(56) References Cited

U.S. PATENT DOCUMENTS

| | | | |
|---|---|---|---|
| 7,620,423 B2 | 11/2009 | Jin et al. | |
| 7,697,485 B2 | 4/2010 | Liu et al. | |
| 7,825,856 B2 | 11/2010 | Na et al. | |
| 7,966,043 B2 | 6/2011 | Guo et al. | |
| 7,978,784 B2 | 7/2011 | Zhang et al. | |
| 2007/0258541 A1 | 11/2007 | Yamaura | |
| 2007/0286303 A1 | 12/2007 | Yamaura | |
| 2009/0042618 A1 | 2/2009 | Hedayat et al. | |
| 2010/0104038 A1* | 4/2010 | Stager et al. | 375/267 |
| 2011/0051636 A1 | 3/2011 | Van Nee et al. | |
| 2011/0201282 A1* | 8/2011 | Van Nee et al. | 455/75 |
| 2011/0268215 A1 | 11/2011 | Khojastepour | |

OTHER PUBLICATIONS

"Wi-Fi Certified™ 802.11n Draft 2.0: Longer-Range, Faster Throughput, Multimedia-Grade Wi-Fi® Networks", 2007 Wi-Fi Alliance, pp. 1-18.
"802.11n: The Standard Revealed", 2009 Cisco Systems Inc., pp. 1-23.

* cited by examiner

*Primary Examiner* — Qutbuddin Ghulamali
(74) *Attorney, Agent, or Firm* — Edell, Shapiro & Finnan, LLC

(57) ABSTRACT

Techniques are provided to allow for implicit determination of the full spatial signature of a wireless channel between first and second wireless devices for multiple-input multiple-output (MIMO) wireless communication between the first and second wireless devices. The first wireless device receives uplink signals at a plurality of antennas of the first wireless device that are transmitted via a plurality of antennas of a second wireless device. Values at a plurality of subcarriers of the received signals across the plurality of antennas of the first wireless device are derived. Using a sliding window for groups of adjacent subcarriers, downlink beamforming weights are computed for each group of subcarriers using channel information of one or more proximate groups of subcarriers. The downlink beamforming weights for the respective groups of subcarriers are applied to a number of spatial streams in a downlink transmission to be transmitted to the second wireless device.

20 Claims, 5 Drawing Sheets

IMPLICIT SPATIAL MATRIX EXPANSION DETERMINATION FOR MIMO WIRELESS COMMUNICATION SYSTEMS

TECHNICAL FIELD

The present disclosure relates to multiple-input multiple-output (MIMO) wireless communication systems.

BACKGROUND

In MIMO wireless communication systems, multiple spatial streams are simultaneously transmitted via multiple antennas of a first wireless device to a second wireless device. When applying beamforming weights to the signals that form the multiple spatial streams to be transmitted, knowledge of the channel information with respect to all of the antennas of the second wireless device is needed for accurate computation of the beamforming weights. In some cases, this channel information is readily available when the second wireless device transmits the same number of spatial streams to the first wireless device. This is not the case, however, when the second wireless device transmits a lesser number of spatial streams to the first wireless device.

DESCRIPTION OF EXAMPLE EMBODIMENTS

Overview

Techniques are provided to allow for implicit determination of the full spatial signature of a wireless channel between first and second wireless devices for multiple-input multiple-output (MIMO) wireless communication between the first and second wireless devices. The first wireless device receives uplink signals at a plurality of antennas of the first wireless device that are transmitted via a plurality of antennas of a second wireless device. Values at a plurality of subcarriers of the received signals across the plurality of antennas of the first wireless device are derived. Using a sliding window for groups of adjacent subcarriers, downlink beamforming weights are computed for each group of subcarriers using channel information of one or more proximate groups of subcarriers. The downlink beamforming weights for the respective groups of subcarriers are applied to a number of spatial streams in a downlink transmission to be transmitted to the second wireless device.

Example Embodiments

Figure 1:
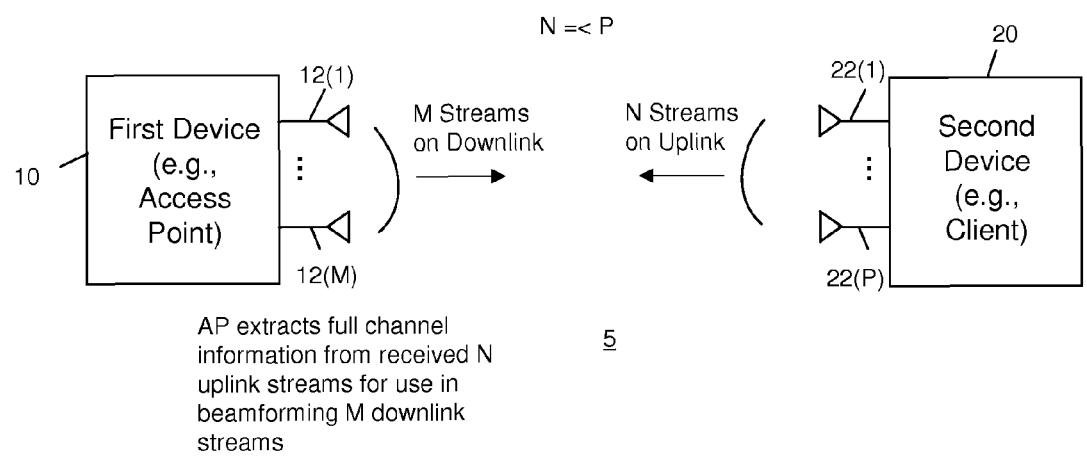
FIG. 1 is a block diagram depicting an example of a MIMO wireless communication system in which a first wireless device is configured to extract full MIMO wireless channel information from received uplink streams transmitted by a second wireless device.

Referring first to FIG. 1, a wireless communication system is shown generally at reference numeral 5. The system 5 comprises a first wireless communication device, e.g., an access point (AP) 10, and at least one second wireless communication devices, e.g., a client device or station (STA) 20. In practical deployments, the AP 10 serves a plurality of client devices but for simplicity only a single client is shown in FIG. 1. The AP 10 comprises a plurality of antennas 12(1)-12(M), and the client device comprises a plurality of antennas 22(1)-22(P). The AP 10 may connect to other wired data network facilities (not shown) and in that sense serves as a gateway or access point through which client device 20 has access to those data network facilities.

The AP 10 may wirelessly communicate with the client device 20 using a wireless communication protocol. An example of such a wireless communication protocol is the IEEE 802.11n communication standard, known commercially as WiFi™ communication protocol. Another example of a suitable wireless communication protocol is the WiMAX™ communication protocol. The IEEE 802.11n standard, for example, employs multiple-input multiple-output (MIMO) wireless communication techniques in which the AP 10, for downlink transmissions to the client device 10, transmits M spatial streams simultaneously via the M plurality of antennas 12(1)-12(M) using beamforming weights applied to the signal streams across the plurality of antennas. Similarly, for uplink transmissions to the AP 10, the client device 20 may transmit N spatial streams simultaneously via its P plurality of antennas 22(1)-22(P). It is more common for the AP 10 to send multiple spatial streams to the client device 20 to improve the throughput to the client device.

In order to transmit multiple spatial streams to the client device, the AP 10 needs to determine the proper beamforming weights for weighting the spatial streams across the plurality of antennas 12(1)-12(M). The AP 10 derives information about the wireless channel between its antennas 12(1)-12(M) and the antennas 22(1)-22(P) of the client device based on uplink transmissions received from the client device 20. To directly derive sufficient channel information to transmit M spatial streams using MIMO techniques, the client needs to send the same number of spatial streams to the AP that the AP uses for downlink transmissions to the client. This is not always the case for several reasons. The client device may not be able to support as many spatial streams on the uplink as the AP can support on the downlink. Even if the client has the ability to support the same number of uplink streams as the number of downlink streams, at any given period of time, the client may select to transmit less streams in the uplink for various reasons (lack of uplink data to send, reduced transmit power, poor channel conditions, etc.). When this occurs, the AP 10 cannot directly obtain the channel information it needs to compute the beamforming weights for downlink transmissions of M spatial streams (more than the number of uplink spatial streams).

Accordingly, a scheme is disclosed herein that can extract the full channel information needed for beamforming M downlink data streams when the AP receives less than M uplink streams from the client. This scheme will allow the AP to derive sufficient information for downlink beamforming transmission of a plurality of spatial streams when any number, N, of streams is sent on the uplink. The AP extracts full channel information from received N uplink streams for use in beamforming M downlink streams.

For example, even when the client device sends one uplink spatial stream, the full spatial information can be derived from the received uplink transmission when the client uses all of its antennas for sending the one uplink spatial stream, for example, when the client device employs a spatial expansion matrix. The full channel information can be obtained if the spatial information carried on multiple frequency bins (subcarriers) is examined jointly as described herein.

Figure 2:
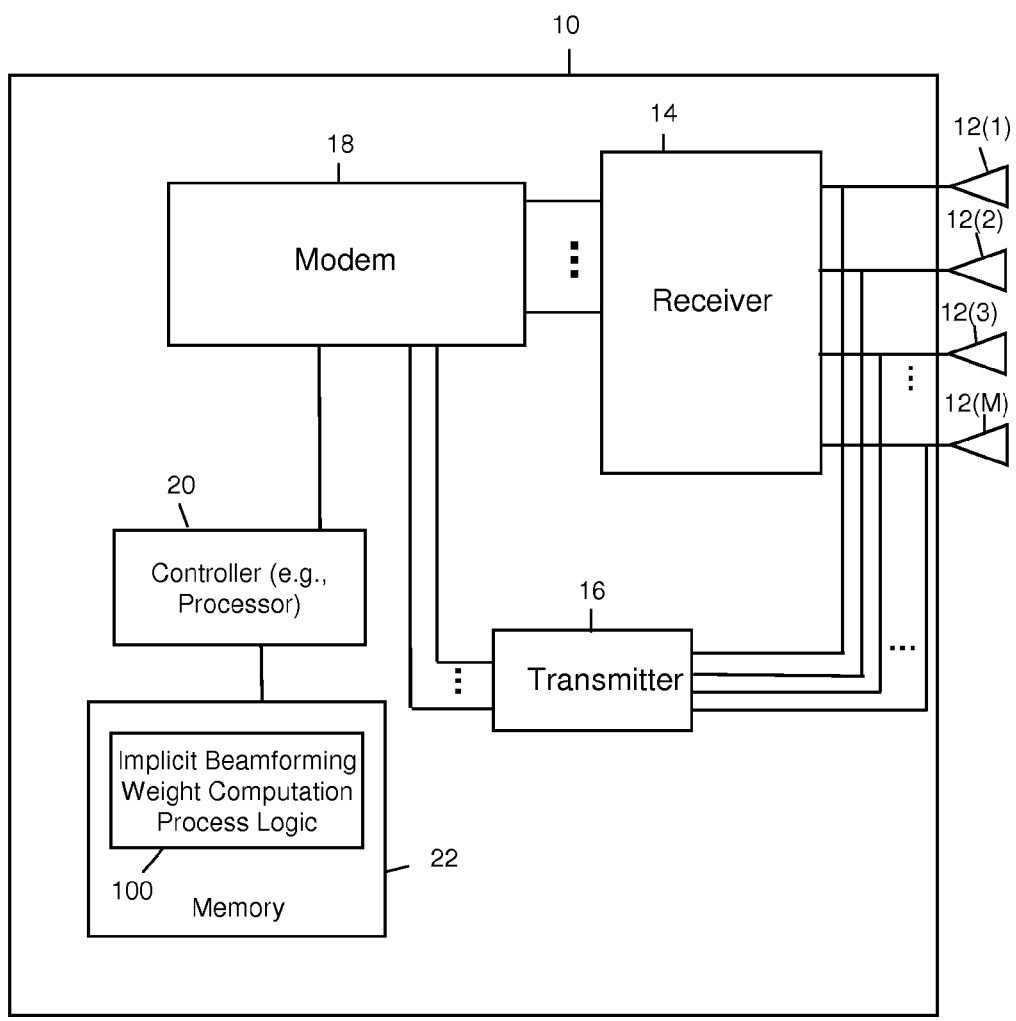
FIG. 2 is a block diagram showing an example of the first wireless device, e.g., a wireless access point device, configured to extract full MIMO wireless channel information from received uplink streams from the second wireless device.

Reference is now made to FIG. 2 that shows an example of a block diagram of AP 10 that is configured to perform the implicit beamforming weight derivation techniques for downlink transmissions of multiple spatial streams. As shown in FIG. 2, the AP 10 comprises a radio receiver 14, a radio transmitter 16, a modem 18, a controller 20 and a memory 22. The radio receiver 14 downconverts signals detected by the plurality of antennas 12(1)-12(M) and supplies antenna-specific receive signals to the modem 18. The receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. Similarly, the transmitter 16 upconverts antenna-specific baseband transmit signals (weighted from application of beamforming weights) to corresponding ones of the plurality of antennas 12(1)-12(M) for transmission. Likewise, the transmitter 16 may comprise individual transmitter circuits that supply respective upconverted signals to corresponding ones of a plurality of antennas 12(1)-12(M) for transmission. For simplicity, these individual transmitter circuits are not shown in FIG. 2.

The controller 20 supplies data to the modem 18 to be transmitted and processes data recovered by the modem 18 from received signals. In addition, the controller 18 performs other transmit and receive control functionality. It should be understood that there are analog-to-digital converters (ADCs) and digital-to-analog converters (DACs) in the various signal paths to convert between analog and digital signals.

The memory 22 stores data used for the techniques described herein. The memory 22 may be separate or part of the controller 20. In addition, instructions for implicit beamforming weight computation process logic 100 may be stored in the memory 22 for execution by the controller 20. The controller 20 supplies the beamforming weights to the modem 18 and the modem 18 applies the beamforming weights signal streams to be transmitted to produce a plurality of weighted antenna-specific transmit signals that are upconverted by the transmitter 16 for transmission by corresponding ones of the plurality of antennas 12(1)-12(M).

The memory 22 is a memory device that may comprise read only memory (ROM), random access memory (RAM), magnetic disk storage media devices, optical storage media devices, flash memory devices, electrical, optical, or other physical/tangible memory storage devices. The controller 20 is, for example, a microprocessor or microcontroller that executes instructions for the process logic 100 stored in memory 22. Thus, in general, the memory 22 may comprise one or more computer readable storage media (e.g., a memory device) encoded with software comprising computer executable instructions and when the software is executed (by the controller 20) it is operable to perform the operations described herein in connection with process logic 100.

The functions of the controller 20 may be implemented by logic encoded in one or more tangible media (e.g., embedded logic such as an application specific integrated circuit, digital signal processor instructions, software that is executed by a processor, etc.), wherein the memory 22 stores data used for the computations described herein (and/or to store software or processor instructions that are executed to carry out the computations described herein). Thus, the process logic 100 may be implemented with fixed logic or programmable logic (e.g., software/computer instructions executed by a processor) and the controller 22 may be a programmable processor, programmable digital logic (e.g., field programmable gate array) or an application specific integrated circuit (ASIC) that comprises fixed digital logic, or a combination thereof. Some or all of the controller functions described herein, such as those in connection with the process logic 100, may be implemented in the modem 18.

Figure 3:
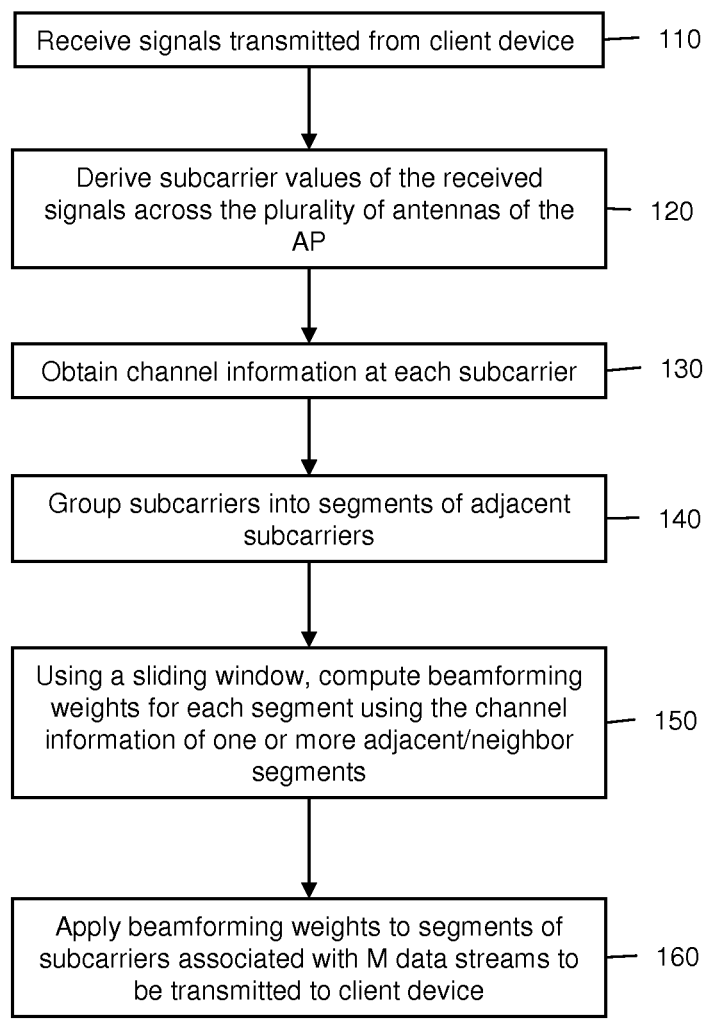
FIG. 3 is a flow chart illustrating examples of operations performed in the first wireless device to extract full MIMO wireless channel information from received uplink streams from the second wireless device.
Figure 4:
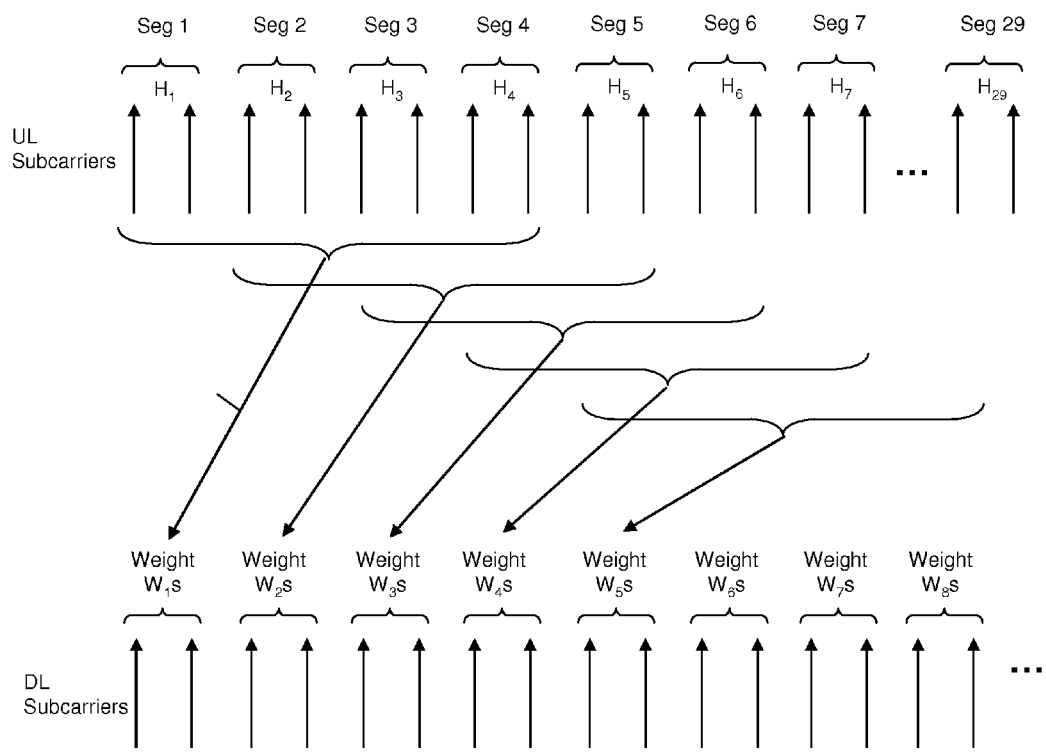
FIG. 4 is a diagram graphically depicting the operations performed in the first wireless device to extract full MIMO wireless channel information from received uplink streams from the second wireless device.

Reference is now made to FIGS. 3 and 4 for a description of a general flow of the operations associated with the process logic 100. The channel estimates (channel state information) from received Orthogonal Frequency Division Multiplexed (OFDM) symbols of the received uplink signals are grouped into segments or groups. For each segment, a sliding window along the frequency domain is used to compute the downlink beamforming weights from the channel state information for neighboring segments. At 110, signals transmitted in an uplink transmission from P plurality of antennas of the client device are received at the M plurality of antennas of the AP. The uplink signals received at 110 may comprise signals for a number of spatial streams less than a number of antennas at the client device (and thus less than the number of spatial streams that the AP could send to the client device). Even though the number of received spatial streams is less than the desired number of downlink spatial streams, the full spatial information for all of the antennas of the client device can be derived according to the techniques described herein. As will become apparent hereinafter, the extraction of the full spatial information is accomplished by jointly examining the spatial information carried over multiple frequency bins (subcarriers) of the received uplink signals.

At 120, values at a plurality of subcarriers of the received signals across the plurality of antennas of the first wireless device are derived from the received signals. At 130, the channel information at each subcarrier (across the M plurality of antennas) is obtained using any of a variety of direct, extrapolation and interpolation techniques known in the art. At 140, adjacent subcarriers are grouped into groups or segments, as shown in FIG. 4. In the example of FIG. 4, there are two subcarriers in each segment or group and there are 29 groups or segments. This is only an example and not meant to be limiting. At 150, using a sliding window, for groups of adjacent subcarriers, downlink beamforming weights are computed using the channel information of one or more groups of uplink subcarriers that are proximate in frequency (neighboring or adjacent) to a particular group of subcarriers is used to compute the downlink beamforming weights at the particular group of subcarriers. Thus, at 150, computing the downlink beamforming weights involves deriving full spatial information for the wireless channel between the AP and the client device when the client device uses a spatial expansion matrix to transmit spatial streams to the AP. At 160, the downlink beamforming weights for the respective groups of subcarriers are applied to a number of spatial streams in a downlink transmission to be transmitted to the client device.

Figure 5:
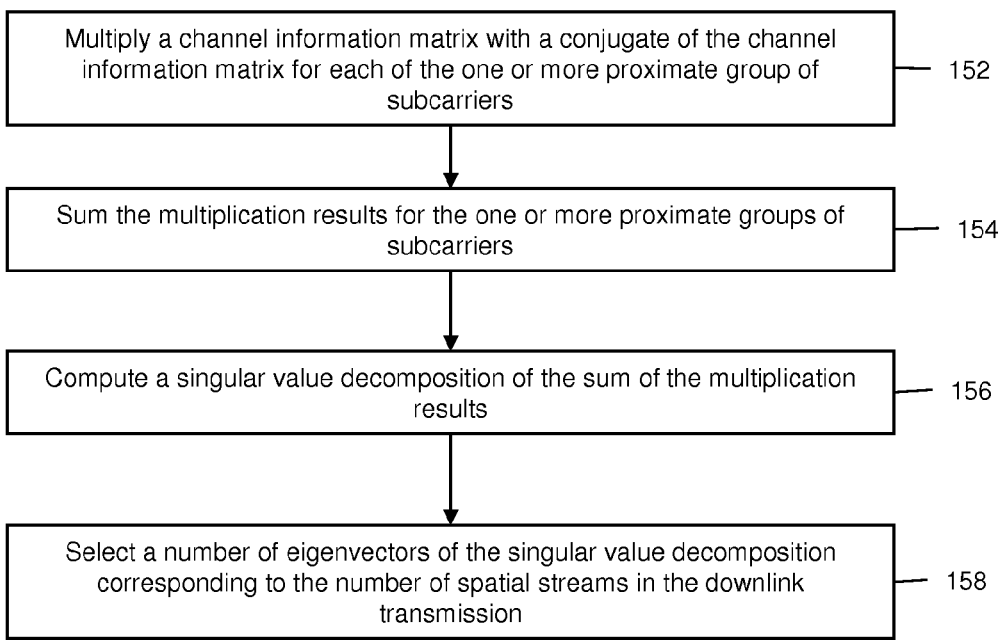
FIG. 5 is a flow chart illustrating in more detail examples of operations performed to compute the downlink beamforming weights.

FIG. 4 graphically illustrates what occurs during operation 150 and FIG. 5 illustrates a flow chart for the operation 150 in more detail. At 152, a channel information matrix is multiplied with a conjugate of the channel information matrix for each of one or more proximate groups of subcarriers and at 154 the multiplication results are summed for the one or more proximate groups of subcarriers. At 156, a singular value decomposition is computed for the sum of the multiplication results. At 158, a number of eigenvectors (corresponding to the number of downlink spatial streams to be transmitted) is selected (the first eigenvectors) from the eigenvectors that result from the singular value decomposition. Those eigenvectors are the downlink beamforming weights used for the beamforming the signals that make up the spatial streams for the downlink transmission.

The following is an example of a more detailed procedure for the operations at 150 for 29 contiguous groups of subcarriers. For Segment/Group 1: the singular value decomposition (SVD) is computed for: $H_1 \times H_1^* + H_2 \times H_2^* + H_3 \times H_3^* + H_3 \times H_3^*$, where $H_1$ is the channel information matrix of uplink subcarrier group i across the M plurality of antennas of the AP, the * denotes the complex conjugate, and the first Nss (number of downlink spatial streams) eigenvectors resulting from the SVD are taken as the downlink beamforming weight vectors for Segment/Group 1. For Segments/Groups 2-27, a singular value decomposition is computed of: $H_{i-1} + H_{i-1}^* + H_i \times H_i^* + H_{i+1} \times H_{i+1}^* + H_{i+2} \times H_{i+2}^*$, where i−1 is a group of subcarriers left adjacent to group i, and i+1 is a group of subcarriers right adjacent to group i, and i+2 is a group of subcarriers right adjacent to group i+1, and the first Nss (number of downlink spatial streams) eigenvectors resulting from the SVD are taken as the downlink beamforming weight vectors for segments/groups 2-27. For Segments/Groups 28 and 29, the SVD is computed of $H_{26} \times H_{26}^* + H_{27} \times H_{27}^* + H_{28} \times H_{28}^* + H_{29} \times H_{29}^*$, and the first Nss (number of downlink spatial streams) eigenvectors resulting from the SVD are taken as the downlink beamforming weight vectors for segment/groups 28 and 29. Thus, it is evident that the computations for the subcarrier groups on the ends, e.g., groups 1, 2, 28 and 29, are modified slightly to account for edge effects.

The following is an example where the AP has four antennas and the client device has two antennas. The client device transmits one spatial stream on the uplink using a spatial expansion $e^{-j2\pi k \Delta f *}/\text{sqrt}(2)$, where $\Delta f=312.5$ kHz and $\Delta f^*$ ($-400$ ns)=⅛. The channel information in the uplink observed from reception of the single spatial stream from subcarriers n−1 to n+2 is:

$$H_{n-1} = \bar{h}_{n-1}^1 + \bar{h}_{n-1}^2 \times e^{j2\pi \frac{n-1}{8}} \quad H_n = \bar{h}_n^1 + \bar{h}_n^2 \times e^{j2\pi \frac{n}{8}}$$
$$H_{n+1} = \bar{h}_{n+1}^1 + \bar{h}_{n+1}^2 \times e^{j2\pi \frac{n+1}{8}} \quad H_{n+2} = \bar{h}_{n+2}^1 + \bar{h}_{n+2}^2 \times e^{j2\pi \frac{n+2}{8}}$$

Thus, the equations above reveal that the received signal at each of the subcarriers contains the information of both client antennas, in different combinations. The covariance matrix for this example is:
$H_{n-1} \times H_{n-1}^H + H_n \times H_n^H + H_{n+1} \times H_{n+1}^H \times H_{n+2} \times H_{n+2}^H$, which is not a simple channel averaging. It contains all the spatial signature information from neighboring subcarriers. As long as the subcarriers are within a spatial signature coherence bandwidth (which is much larger than the channel coherence bandwidth), the spatial signature of both antennas of the client device can be obtained. In a WiFi channel model, a spatial signature correlation within 8 subcarriers is fairly large.

In summary, the techniques described herein allow for deriving the full downlink spatial information in an implicit manner even when the uplink information is designed to reveal channel information for a lesser number of spatial streams. This allows the downlink and uplinks to support unequal spatial multiplexing and yet maintain improved capacity. These techniques are useful when the client device sends uplink transmissions using all of its antennas but with a less number of spatial streams that would otherwise directly reveal the full channel information needed for downlink transmissions with a greater number of spatial streams. The covariance computed at the AP will take into account spatial signatures for all of the antennas of the client device (assuming the client device transmits with all of its antennas).

The above description is intended by way of example only. Various modifications and structural changes may be made therein without departing from the scope of the concepts described herein and within the scope and range of equivalents of the claims.

What is claimed is:

1. A method comprising:
   receiving uplink signals at a plurality of antennas of a first wireless device that are transmitted via a plurality of antennas of a second wireless device;
   deriving values at a plurality of subcarriers of the received signals across the plurality of antennas of the first wireless device; and
   using a sliding window across groups of neighboring subcarriers, computing downlink beamforming weights for each group of subcarriers such that for a particular group of subcarriers, channel information for two or more groups of subcarriers that are proximate in frequency to the particular group of subcarriers is used to compute the downlink beamforming weights at the particular group of subcarriers.

2. The method of claim 1, wherein receiving comprises receiving signals from the second wireless device that comprise a number of spatial streams less than a number of the plurality of antennas at the second wireless device.

3. The method of claim 1, wherein computing comprises deriving full spatial information for a wireless channel between the first wireless device and the second wireless device when the second wireless device uses a spatial expansion matrix to transmit spatial streams to the first wireless device.

4. The method of claim 1, further comprising applying the downlink beamforming weights for each group of subcarriers to a number of spatial streams in a downlink transmission to be transmitted to the second wireless device.

5. The method of claim 1, wherein each group of subcarriers comprises at least two subcarriers.

6. The method of claim 1, wherein computing comprises multiplying a channel information matrix with a conjugate of the channel information matrix for each of the one or more proximate group of subcarriers, summing the multiplication results for the one or more proximate groups of subcarriers, computing a singular value decomposition of the sum of the multiplication results, and selecting a number of eigenvectors of the singular value decomposition corresponding to the number of spatial streams in the downlink transmission.

7. The method of claim 1, wherein computing comprises, for group i in the plurality of groups of subcarriers, computing a singular value decomposition of $H_{i-1} \times H_{i-1}^* + H_i \times H_i^* + H_{i+1} \times H_{i+1}^* + H_{i+2} \times H_{i+2}^*$, where H is the channel information matrix across the plurality of antennas of the first wireless device and $H^*$ is the conjugate of the channel information matrix, and i−1 is a group of subcarriers left adjacent to group i, i+1 is a group of subcarriers right adjacent to group i, and i+2 is a group of subcarriers right adjacent to group i+1, and selecting a number of eigenvectors resulting from the singular value decomposition, wherein the number of eigenvectors is equal to the number of spatial streams in the downlink transmission.

8. An apparatus comprising:
a plurality of antennas;
a receiver coupled to the plurality of antennas and configured to downconvert signals uplink signals sent by a wireless device and detected by the plurality of antennas;
a modem configured to derive values at a plurality of subcarriers of the received signals across the plurality of antennas and to obtain channel information at the subcarriers;
a processor coupled to the modem and configured to, using a sliding window across groups of neighboring subcarriers, compute downlink beamforming weights for each group of subcarriers such that for a particular group of subcarriers, channel information for two or more groups of subcarriers that are proximate in frequency to the particular group of subcarriers is used to compute the downlink beamforming weights at the particular group of subcarriers.

9. The apparatus of claim 8, and further comprising a transmitter configured to generate transmit signals for the downlink transmission and to supply the transmit signals to respective ones of the plurality of antennas.

10. The apparatus of claim 8, wherein the processor is configured to compute the downlink beamforming weights from receive signals that comprise a number of spatial streams less than a number of a plurality of antennas at the wireless device.

11. The apparatus of claim 8, wherein the processor is configured to derive full spatial information when the wireless device uses a spatial expansion matrix to transmit spatial streams in the uplink transmission.

12. The apparatus of claim 8, wherein the processor is configured to apply the downlink beamforming weights for each group of subcarriers to a number of spatial streams in a downlink transmission to be transmitted to the wireless device.

13. The apparatus of claim 8, wherein the processor is configured to compute the downlink beamforming weights by multiplying a channel information matrix with a conjugate of the channel information matrix for each of the one or more proximate group of subcarriers, summing the multiplication results for the one or more proximate groups of subcarriers, computing a singular value decomposition of the sum of the multiplication results, and selecting a number of eigenvectors of the singular value decomposition corresponding to the number of spatial streams in the downlink transmission.

14. The apparatus of claim 8, wherein the processor is configured to compute the downlink beamforming weights by, for group i in the plurality of groups of subcarriers, computing a singular value decomposition of $H_{i-1} \times H_{i-1}^* + H_i \times H_i^* + H_{i+1} \times H_{i+1}^* + H_{i+2} \times H_{i+2}^*$, where H is the channel information matrix across the plurality of antennas of the first wireless device and H* is the conjugate of the channel information matrix, and i−1 is a group of subcarriers left adjacent to group i, i+1 is a group of subcarriers right adjacent to group i, and i+2 is a group of subcarriers right adjacent to group i+1, and selecting a number of eigenvectors resulting from the singular value decomposition, wherein the number of eigenvectors is equal to the number of spatial streams in the downlink transmission.

15. One or more non-transitory computer readable storage media encoded with software instructions that when executed are operable to:
derive values at a plurality of subcarriers of the received uplink signals across a plurality of antennas of a first wireless device that are transmitted via a plurality of antennas of a second wireless device; and
using a sliding window across groups of neighboring subcarriers, compute downlink beamforming weights for each group of subcarriers such that for a particulat group of subcarriers, channel information for two or more groups of subcarriers that are proximate in frequency to the particular group of subcarriers is used to compute the downlink beamforming weights at the particular group of subcarriers.

16. The non-transitory computer readable storage media of claim 15, wherein the instructions that are operable to derive values at the plurality of subcarriers comprise instructions operable to derive values at subcarriers for signals received from the second wireless device that comprise a number of spatial streams less than a number of the plurality of antennas of the second wireless device.

17. The non-transitory computer readable storage media of claim 15, wherein the instructions that are operable to compute comprise instructions operable to derive full spatial information for a wireless channel between the first wireless device and the second wireless device when the second wireless device uses a spatial expansion matrix to transmit spatial streams to the first wireless device.

18. The non-transitory computer readable storage media of claim 15, further comprising instructions that are operable to applying the downlink beamforming weights for each group of subcarriers to a number of spatial streams in a downlink transmission to be transmitted to the second wireless device.

19. The non-transitory computer readable storage media of claim 15, wherein the instructions that are operable to compute comprise instructions operable to multiply a channel information matrix with a conjugate of the channel information matrix for each of the one or more proximate group of subcarriers, sum the multiplication results for the one or more proximate groups of subcarriers, compute a singular value decomposition of the sum of the multiplication results, and select a number of eigenvectors of the singular value decomposition corresponding to the number of spatial streams in the downlink transmission.

20. The non-transitory computer readable storage media of claim 15, wherein the instructions that are operable to compute comprises instructions operable to, for group i in the plurality of groups of subcarriers, compute a singular value decomposition of $H_{i-1} \times H_{i-1}^* + H_i \times H_i^* + H_{i+1} \times H_{i+1}^* + H_{i+2} \times H_{i+2}^*$, where H is the channel information matrix across the plurality of antennas of the first wireless device and H'* is the conjugate of the channel information matrix, and i−1 is a group of subcarriers left adjacent to group i, i+1 is a group of subcarriers right adjacent to group i, and i+2 is a group of subcarriers right adjacent to group i+1, and select a number of eigenvectors resulting from the singular value decomposition, wherein the number of eigenvectors is equal to the number of spatial streams in the downlink transmission.

* * * * *